US007761605B1

(12) United States Patent
Rothwell et al.

(10) Patent No.: US 7,761,605 B1
(45) Date of Patent: Jul. 20, 2010

(54) EMBEDDED ANTI-VIRUS SCANNER FOR A NETWORK ADAPTER

(75) Inventors: Anton C. Rothwell, Aylesbury (GB); William R. Dennis, Aylesbury (GB); Luke D. Jagger, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 1209 days.

(21) Appl. No.: 10/028,650

(22) Filed: Dec. 20, 2001

(51) Int. Cl.
*G06F 15/16* (2006.01)
*G06F 11/00* (2006.01)
*G06F 12/14* (2006.01)
*G06F 12/16* (2006.01)

(52) U.S. Cl. .......................... 709/250; 726/22; 726/23; 726/24

(58) Field of Classification Search .................. 709/220, 709/224, 250, 206; 713/201; 370/463, 401; 714/38; 340/825; 375/219, 222; 703/23–28; 726/22–24
See application file for complete search history.

(56) References Cited

U.S. PATENT DOCUMENTS

| 5,452,442 | A | * | 9/1995 | Kephart | 714/38 |
| 5,502,833 | A | | 3/1996 | Byrn et al. | 395/459 |
| 5,511,163 | A | * | 4/1996 | Lerche et al. | 714/28 |
| 5,623,600 | A | * | 4/1997 | Ji et al. | 713/201 |
| 5,799,064 | A | * | 8/1998 | Sridhar et al. | 379/93.06 |
| 5,802,277 | A | * | 9/1998 | Cowlard | 726/22 |
| 5,896,499 | A | * | 4/1999 | McKelvey | 713/201 |
| 5,915,008 | A | | 6/1999 | Dulman | 379/201 |
| 5,968,176 | A | * | 10/1999 | Nessett et al. | 713/201 |
| 6,006,329 | A | * | 12/1999 | Chi | 726/24 |
| 6,009,520 | A | * | 12/1999 | Gharda | 713/1 |
| 6,075,863 | A | * | 6/2000 | Krishnan et al. | 713/191 |
| 6,119,165 | A | * | 9/2000 | Li et al. | 709/229 |
| 6,161,130 | A | * | 12/2000 | Horvitz et al. | 709/206 |
| H1944 | H | | 2/2001 | Cheswick et al. | 726/11 |
| 6,279,113 | B1 | * | 8/2001 | Vaidya | 713/201 |
| 6,298,444 | B1 | | 10/2001 | Foss et al. | 726/22 |
| 6,401,210 | B1 | * | 6/2002 | Templeton | 726/24 |
| 6,513,122 | B1 | * | 1/2003 | Magdych et al. | 713/201 |
| 6,658,562 | B1 | * | 12/2003 | Bonomo et al. | 713/1 |
| 6,661,803 | B1 | | 12/2003 | Choi et al. | 370/413 |
| 6,721,424 | B1 | * | 4/2004 | Radatti | 380/286 |
| 6,910,134 | B1 | * | 6/2005 | Maher et al. | 726/24 |
| 6,981,765 | B2 | | 12/2005 | Rees et al. | 719/313 |
| 7,023,861 | B2 | * | 4/2006 | Makinson et al. | 370/401 |
| 7,107,617 | B2 | * | 9/2006 | Hursey et al. | 726/22 |
| 7,188,367 | B1 | * | 3/2007 | Edwards et al. | 726/24 |

(Continued)

FOREIGN PATENT DOCUMENTS

WO 98/45778 10/1998

OTHER PUBLICATIONS

3Com. 3Com Embedded Firewall Architecture for E-Business. Technical Brief 100969-001. 3Com Corporation, Apr. 2001.*

(Continued)

*Primary Examiner*—Philip J Chea
(74) *Attorney, Agent, or Firm*—Zilka-Kotab, PC

(57) ABSTRACT

A network adapter system and associated method are provided. The network adapter system includes a processor positioned on a network adapter coupled between a computer and a network. Such processor is configured for scanning network traffic transmitted between the computer and the network.

34 Claims, 5 Drawing Sheets

U.S. PATENT DOCUMENTS

| | | | | |
|---|---|---|---|---|
| 2001/0039624 | A1* | 11/2001 | Kellum | 713/201 |
| 2002/0078190 | A1* | 6/2002 | Ullmann | 709/223 |
| 2002/0162026 | A1* | 10/2002 | Neuman et al. | 713/201 |
| 2003/0051142 | A1 | 3/2003 | Hidalgo et al. | 713/176 |
| 2003/0097585 | A1 | 5/2003 | Girard | 713/200 |
| 2003/0167410 | A1* | 9/2003 | Rigstad et al. | 713/201 |
| 2004/0003284 | A1* | 1/2004 | Campbell et al. | 713/201 |
| 2005/0259678 | A1* | 11/2005 | Gaur | 370/463 |

OTHER PUBLICATIONS

3Com. Embedded Firewall for the 3Cr990 NICs Family. Software Solutions 600478-001. 3Com Corporation, Aug. 2001.*

Edwards, Mark. "Embedded Firewalls: The Next Wave?." WindowsIT Pro Apr. 18, 2001. Jan. 31, 2005 <http://www.windowsitpro.com/Articles/Print.cfm?ArticleID=20703>.*

VirusScan for Windows 95. User's Guide. McAfee. 1997. pp. 26,47.*

Office Action Summary from U.S. Appl. No. 10/028,652 which was mailed on Jan. 12, 2006.

Answers.com, Definition: Solid State, p. 1.

BIGfire User Manual, 1999, p. 14.

Advisory Action from U.S. Appl. No. 10/028,652 which was mailed on Mar. 23, 2006.

U.S. Appl. No. 09/047,207, filed Mar. 24, 1998.

Examiner's Answer from U.S. Appl. No. 10/028,652 which was mailed on May 25, 2007.

Office Action Summary from U.S. Appl. No. 10/028,652 which was mailed on May 26, 2006.

Final Office Action Summary from U.S. Appl. No. 11/854,419 mailed on Feb. 27, 2009.

Decision on Appeal from U.S. Appl. No. 10/028,652 which was mailed on Apr. 1, 2009.

Office Action Summary from U.S. Appl. No. 11/854,419 which was mailed on Aug. 15, 2008.

Office Action Summary from U.S. Appl. No. 10/028,652 mailed on Jun. 30, 2009.

Office Action Summary from U.S. Appl. No. 10/028,652 which was mailed on Jan. 12, 2006.

Answers.com, Definition: Solid State, p. 1, Nov. 2, 2006.

Examiner's Answer from U.S. Appl. No. 11/854,419 mailed on Nov. 3, 2009.

Final Office Action Summary from U.S. Appl. No. 10/028,652 mailed on Dec. 18, 2009.

* cited by examiner

US 7,761,605 B1

EMBEDDED ANTI-VIRUS SCANNER FOR A NETWORK ADAPTER

FIELD OF THE INVENTION

The present invention relates to network adapters, and more particularly to interfacing with computers.

BACKGROUND OF THE INVENTION

In computer networks, a host computer system is normally connected to the network by a network adapter. In some designs, the network adapter is a board that plugs into the backplane bus of the host computer system. In other designs, the network adapter is built into the CPU motherboard. The host computer system typically includes a device driver which operates the network adapter.

Computer networks transfer data from one network node to another in the form of packets. For the purposes here, packets may include information for all layers of the ISO/OSI model at and above the data link layer. The network adapter transmits packets from the host computer system onto the network, and delivers packets from the network to the host computer system.

During operation, the host computer system produces two types of host memory buffers that are consumed by the network adapter: (1) transmit buffers containing packets to be transmitted onto the network, and (2) receive buffers to hold packets received from the network. The host computer system notifies the network adapter when either type of host memory buffer is produced. Similarly, the network adapter notifies the host computer system when it finishes consuming either type of buffer.

For example, to transmit a packet onto the network, the host computer system produces a transmit buffer by allocating a host memory buffer from a free pool of memory buffers, and writing the packet to the host memory buffer. The host computer system then notifies the network adapter that the transmit buffer has been produced (the packet is ready for transmission). The network adapter consumes the transmit buffer by transmitting the packet onto the network. The network adapter then notifies the host computer system that the buffer has been consumed (transmission has completed).

To receive a packet from the network, the host computer system first produces a receive buffer by allocating a host memory buffer into which a packet from the network may be received. The host computer system then notifies the network adapter that the receive buffer has been produced. When the network adapter subsequently receives a packet from the network to be stored in host memory, it consumes the receive buffer by writing the packet to it. The network adapter then notifies the host that the receive buffer has been consumed (the packet has been received).

When the host computer system is notified that a host memory buffer has been consumed (either a transmit buffer or a receive buffer), it completes the processing of that host memory buffer. The host computer system completes processing a consumed transmit buffer by returning the transmit buffer to the free pool of host memory buffers. The host computer system completes processing a consumed receive memory buffer by delivering the received packet to the appropriate user process, and then returning the receive buffer to the free pool of host memory buffers.

The host computer system typically notifies the network adapter after each host memory buffer has been produced by writing a register on the network adapter. The network adapter typically notifies the host computer system after each host memory buffer has been consumed by sending an interrupt to the host processor in the host computer system.

To date, there has been no meaningful extension of the capabilities of network adapters to accomplish other tasks such as contributing to network security. Conventionally, the network adapter is often the ingress point for many untrusted files and data, which may proliferate a virus on the associated computer. Unfortunately, such ingress point fails to provide any security features to prevent an attack on the computer.

DISCLOSURE OF THE INVENTION

A network adapter system and associated method are provided. The network adapter system includes a processor positioned on a network adapter coupled between a computer and a network. Such processor is configured for scanning network traffic transmitted between the computer and the network.

In one embodiment, the processor is capable of being user-configured. Further, the processor is capable of being user-configured locally and/or remotely via a network connection with the network adapter. Still yet, the processor is capable of being user-configured only after the verification of a password.

In another embodiment, the manner in which the scanning is performed is capable of being user-configured. Further, the settings of the network adapter are capable of being user-configured.

In still another embodiment, the processor is capable of determining whether received packets are of interest. Such determination as to which received packets are of interest may be based on a protocol associated with the packets.

In use, the processor is capable of passing received packets that are not of interest to the computer. Further, processor is capable of scanning received packets that are of interest. The processor is then further capable of denying received packets that fail the scan.

DESCRIPTION OF THE PREFERRED EMBODIMENTS

Figure 1:
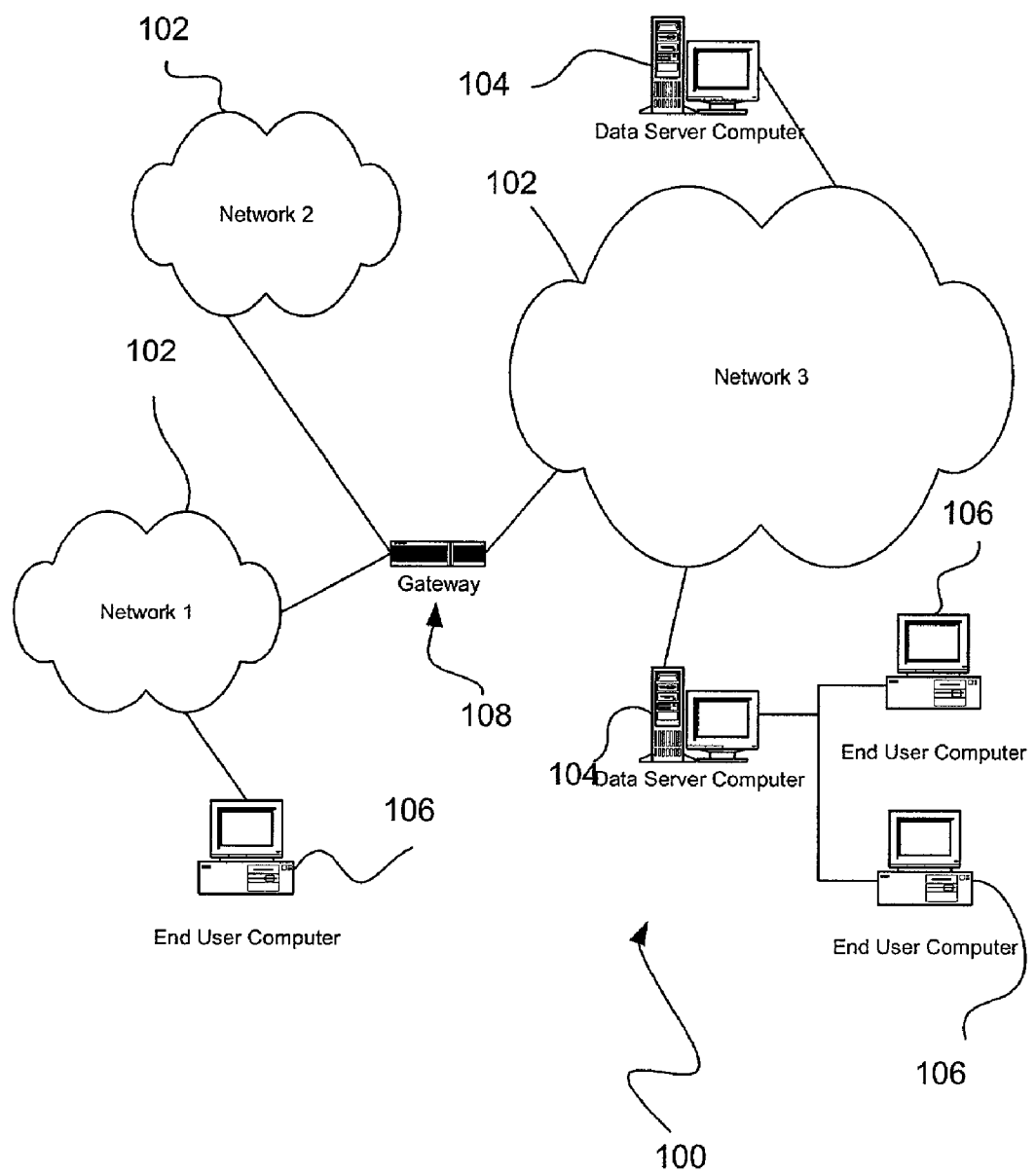
FIG. 1 illustrates a network architecture, in accordance with one embodiment.

FIG. 1 illustrates a network architecture 100, in accordance with the one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In the context of the present description, a computer may refer to any web server, desktop computer, lap-top computer, handheld computer, printer or any other type of hardware/software.

In order to facilitate communication among the networks 102, at least one gateway 108 is coupled therebetween. It should be noted that each of the foregoing network devices as well as any other unillustrated devices may be interconnected by way of a plurality of network segments. In the context of the present description, a network segment includes any portion of any particular network capable of connecting different portions and/or components of a network.

Figure 2:
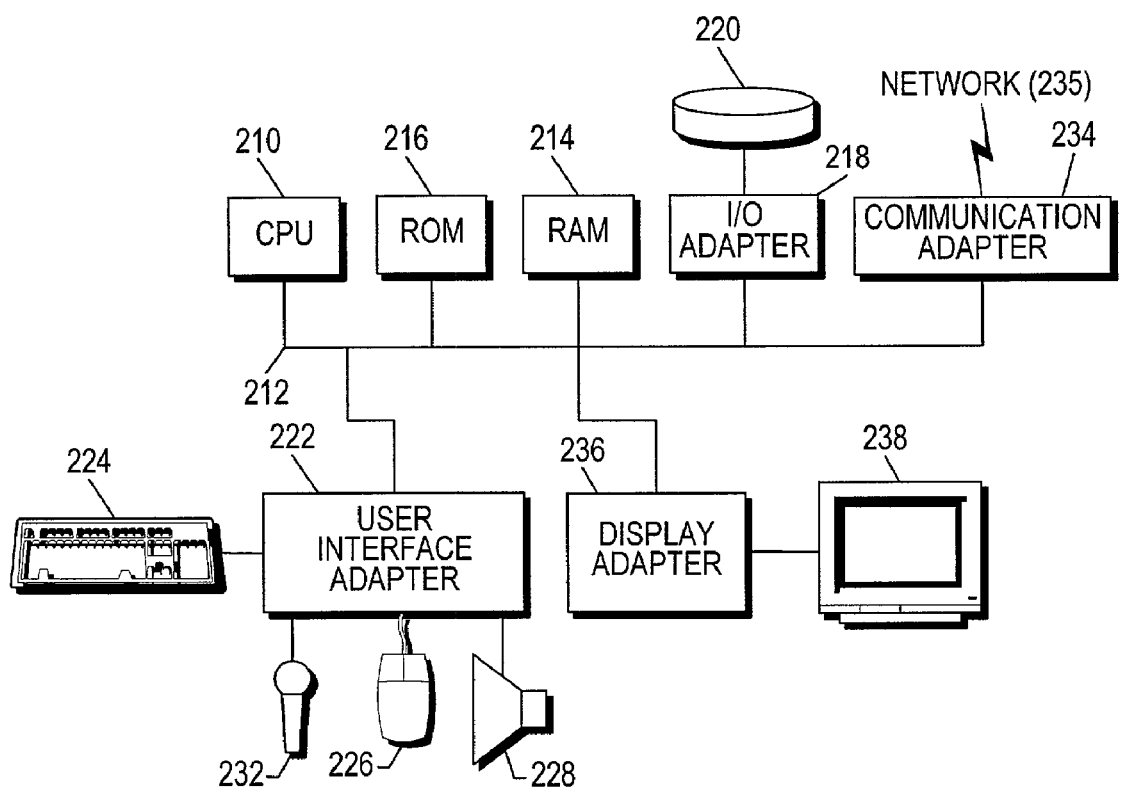
FIG. 2 shows a representative hardware environment that may be associated with the data server computers and user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
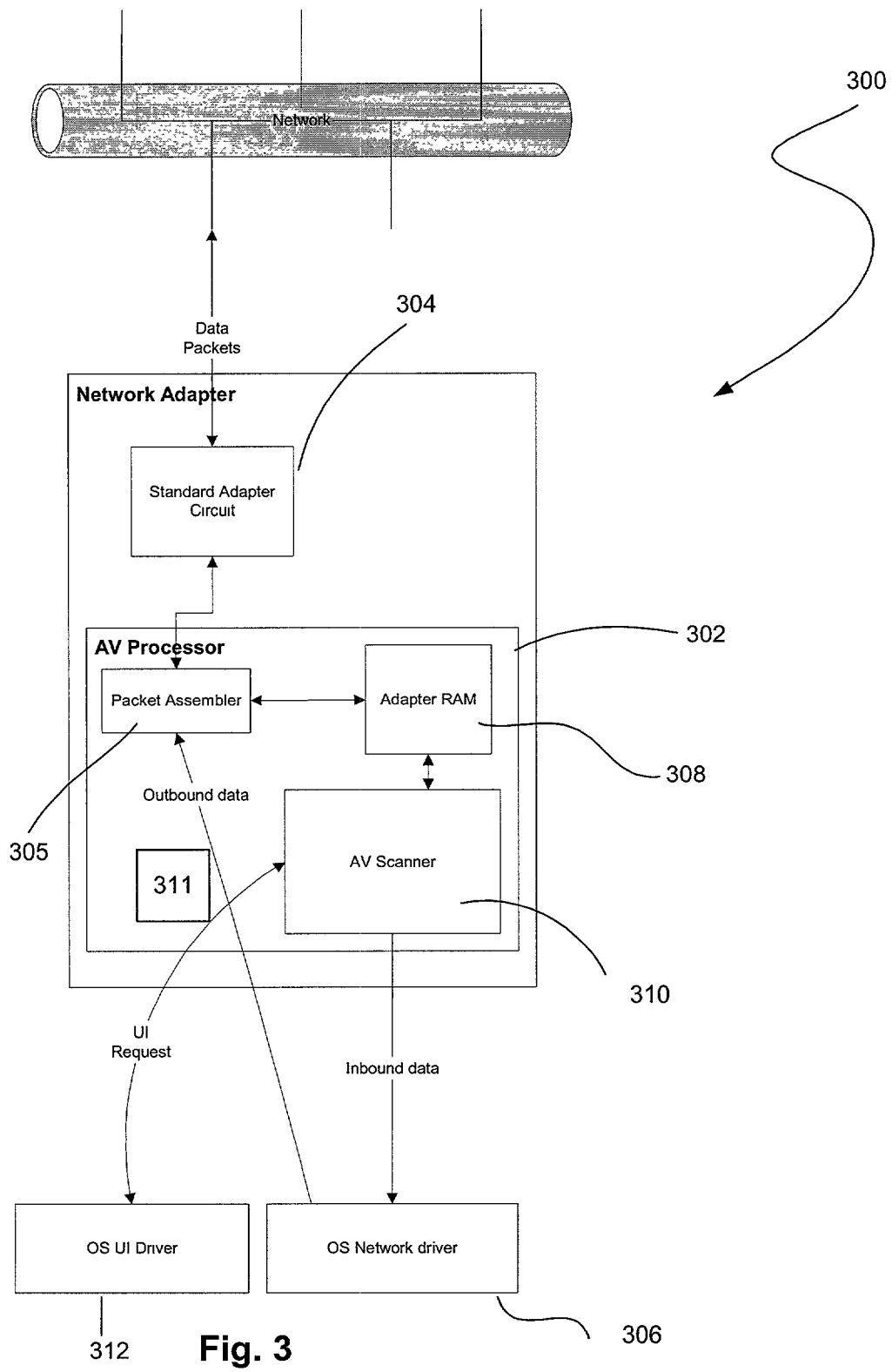
FIG. 3 illustrates an exemplary network adapter that may be coupled between a computer and a network like those shown in FIGS. 1 and 2.

FIG. 3 illustrates an exemplary network adapter 300 that may be coupled between a computer and a network like those shown in FIGS. 1 and 2. Of course, such network adapter 300 may be coupled between any computer and any network in any desired context.

It should be noted that the network adapter 300 may include any Peripheral Component Interconnect (PCI) card, Industry Standard Architecture (ISA) card, Integrated Services Digital Network (ISDN) adapter, cable modem adapter, broadband adapter, or any other type of adapter capable of being installed on any sort of housing associated with a desktop, laptop or any other type of computer. Of course, the network adapter 300 may comprise any sort of interface between the network and the computer.

As shown in FIG. 3, the network adapter 300 includes a processor 302 in communication with a standard adapter circuit 304. The processor 302 is further coupled to the computer, while the standard adapter circuit 304 is coupled to the network. It should be noted that this configuration may vary per the desires of the user. For example, the standard adapter circuit 304 may be coupled to the computer, while the processor 302 is coupled to the network.

Such standard adapter circuit 304 may include various voltage regulating circuits, a bus, light emitting diode connections, and/or any other conventional circuitry commonly implemented in a network adapter 300. The processor 302 of the network adapter 300 may include a single semiconductor platform or multiple interconnected semiconductor platforms with associated logic to accomplish the functionality set forth herein.

The processor 302 of the network adapter 300 may also include a packet assembler module 305 coupled to the standard adapter circuit 304 for assembling packets received from the network and packetizing information received from the computer. It should be noted that the processor 302 of the network adapter 300 is in communication with an operating system network driver 306 associated with the computer for receiving outbound data therefrom and further conditionally sending inbound data thereto, in a manner that will be set forth in greater detail during reference to FIG. 4.

Also included is adapter random access memory (RAM) 308 coupled to the packet assembler module 305 for storing packets received therefrom. It should be noted that the memory 308 may include any cache or fast memory capable of allowing quick storage and/or retrieval of data.

Still yet, the processor 302 of the network adapter 300 includes a scanner 310. Such scanner 310 includes anti-virus scanning capabilities. Such scanner 310 may be adapted for scanning for known types of security events in the form of malicious programs such as viruses, worms, and Trojan horses. Still yet, [0]the scanner 310 may be adapted for content scanning to enforce an organization's operational policies [i.e. detecting harassing or pornographic content, junk e-mails, misinformation (virus hoaxes), etc.]. Of course, the scanner 310 may take any other sort of security measures.

Optionally, various virus signature files and other related control information associated with the scanner 310 may be stored on a non-volatile solid state memory (i.e. FLASH RAM). This may be user protected by configuring the network adapter 300 BIOS with a password that only a user can change, as will soon become apparent.

As an option, a control module 311 may be used to control the overall operation of the network adapter 300. It should be noted, however, that the overall operation may be controlled in any desired manner. For example, the processor 302 may be controlled at least in part by way of the computer or a remote administrator communicating via the network.

A user interface driver 312 is coupled to the scanner 310 for facilitating the configuration of the scanner 310 and various other aspects of the network adapter 300. More information on such configurability will be set forth in greater detail during reference to FIG. 5.

Figure 4:
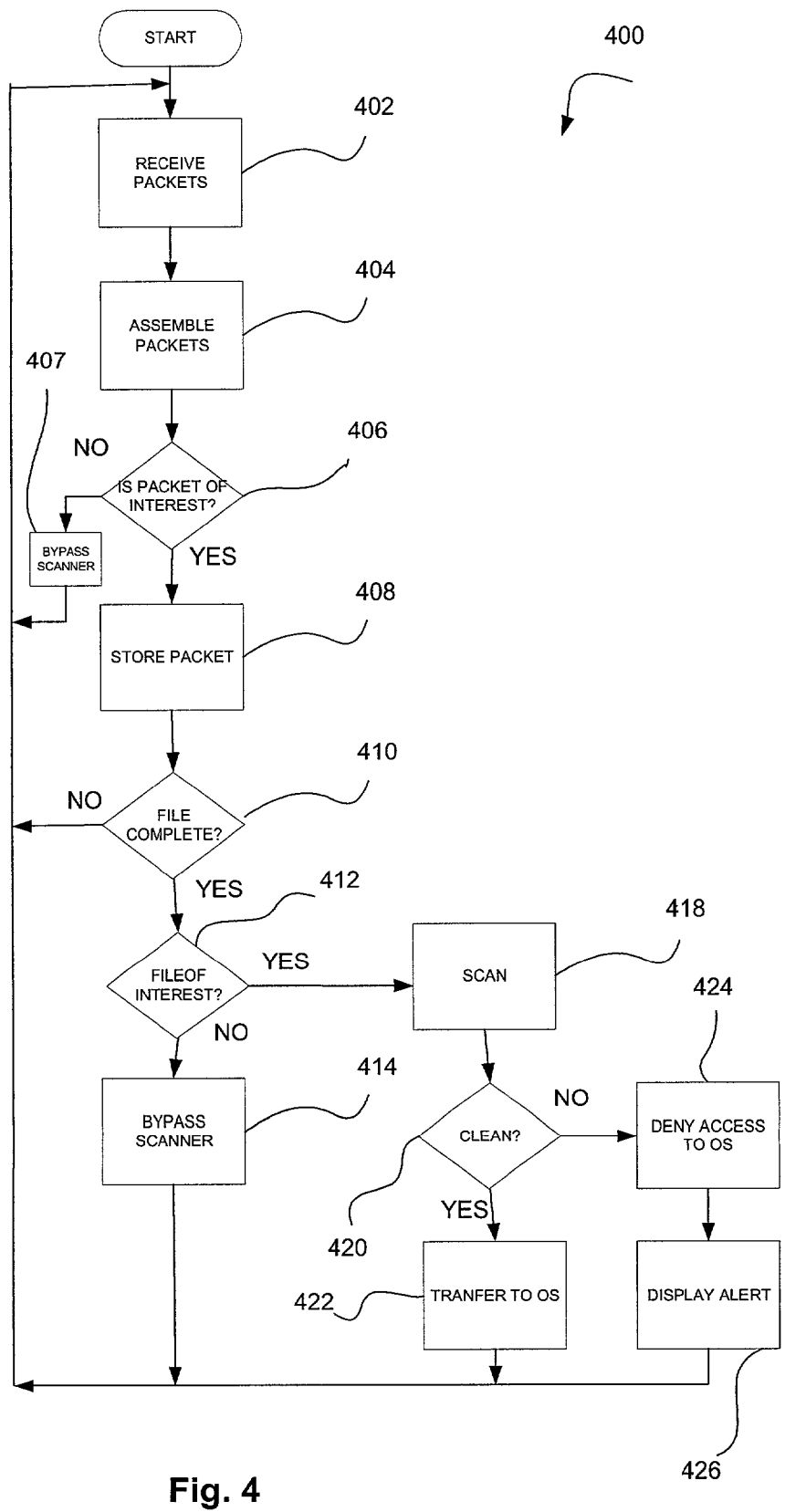
FIG. 4 illustrates a method for scanning incoming data utilizing a network adapter.

FIG. 4 illustrates a method 400 for scanning network traffic (i.e. communications, data, etc.) utilizing a network adapter. In one embodiment, the present method 400 may be used in the context of a network adapter like that mentioned hereinabove during reference the previous figure. Of course, the present techniques may be utilized in any desired context.

Initially, packets are received in operation 402 from the network. As mentioned earlier, this may be accomplished directly or through a standard adapter circuit 304, or by any other conduit. Thereafter, the packets are assembled in operation 404. This may be accomplished in any feasible method. For example, the packet assembler module 305 may utilize header information associated with the packets for assembling the data fields of the packets.

As each packet arrives, it is determined whether the packets are of interest. Note decision 406. Such determination may be based on any desired factor such as a source of the packet, a protocol associated with the packet, a timing of the packet, contents of the packet, and/or any other desired factor. In any embodiment where certain protocols are of interest, a predetermined amount of packets may need to be assembled to first identify whether the packets are of interest. Table #1 illustrates an exemplary list of protocols that may be of interest. It should be noted that such list may vary based on a security threat that files using a particular protocol pose.

TABLE #1

HTTP file requests
FTP file transfers
Novell NetWare file transfers
Windows Files transfers If the packets are not of interest, as decided in decision 406, the packets are bypassed directly to the computer. See operation 407. This may be accomplished by bypassing the scanner 310 and RAM 308, and communicating directly with the network driver 306 of the computer. By this design, the packets that are not to be scanned are communicated with the computer as fast as possible.

If, on the other hand, the packets are of interest, as decided in decision 406, the packets are cached in operation 408. For example, they may be stored in the memory 308. This process continues until it is determined that a file or any other desired unit of data is complete in decision 410. If the file is not complete, the process continues until enough packets of interest are received so as to complete a file.

Once a file is complete, as determined in decision 410, it is then determined whether the file is of interest in decision 410. For example, it may be determined that only certain files (i.e. executables, etc.) are of interest. It should be noted that such determination may not be able to be made at the packet level decision 406. Again, if the file is not of interest, as decided in decision 412, the packets are bypassed directly to the computer. See operation 414. This may be again accomplished by bypassing the scanner 310 and the memory 308, and communicating directly with the network driver 306 of the computer. By this design, files that are not to be scanned are communicated with the computer as fast as possible.

If, however, the file is of interest, a scan is performed, as set forth in operation 418. In one embodiment, the scan is performed by the scanner 310 on the hardware processor 302 positioned on the network adapter 300. If it is determined that the file is clean in decision 420, the file is transferred to the computer (i.e. network driver 306). If, however, any virus, suspicious content, malicious code, etc. is found in decision 420, access may be denied to the computer in operation 424. This way, no contaminated packets and/or files reach the computer.

Further, an alert may be displayed for notifying a user of the denial of access and contaminated file/packets. As an option, such alert may also provide options as to remedies for the situation (i.e. clean, delete, quarantine, etc.). Such alert may be conveyed in any desired manner. For example, the alert may be provided to a remote administrator, using an indicator on the network adapter, and/or an interface on the computer. To accomplish this, such alert may be sent to the user interface driver 312.

It should be noted that the foregoing process may also be applied to outgoing packets. This feature may be considered as an option that may be configured in a manner that will soon be set forth.

To this end, the scanning is accelerated through use of the hardware processor for scanning purposes. Further, by the critical positioning of the hardware processor on the network adapter, protection is inherently provided whenever network access is gained.

Figure 5:
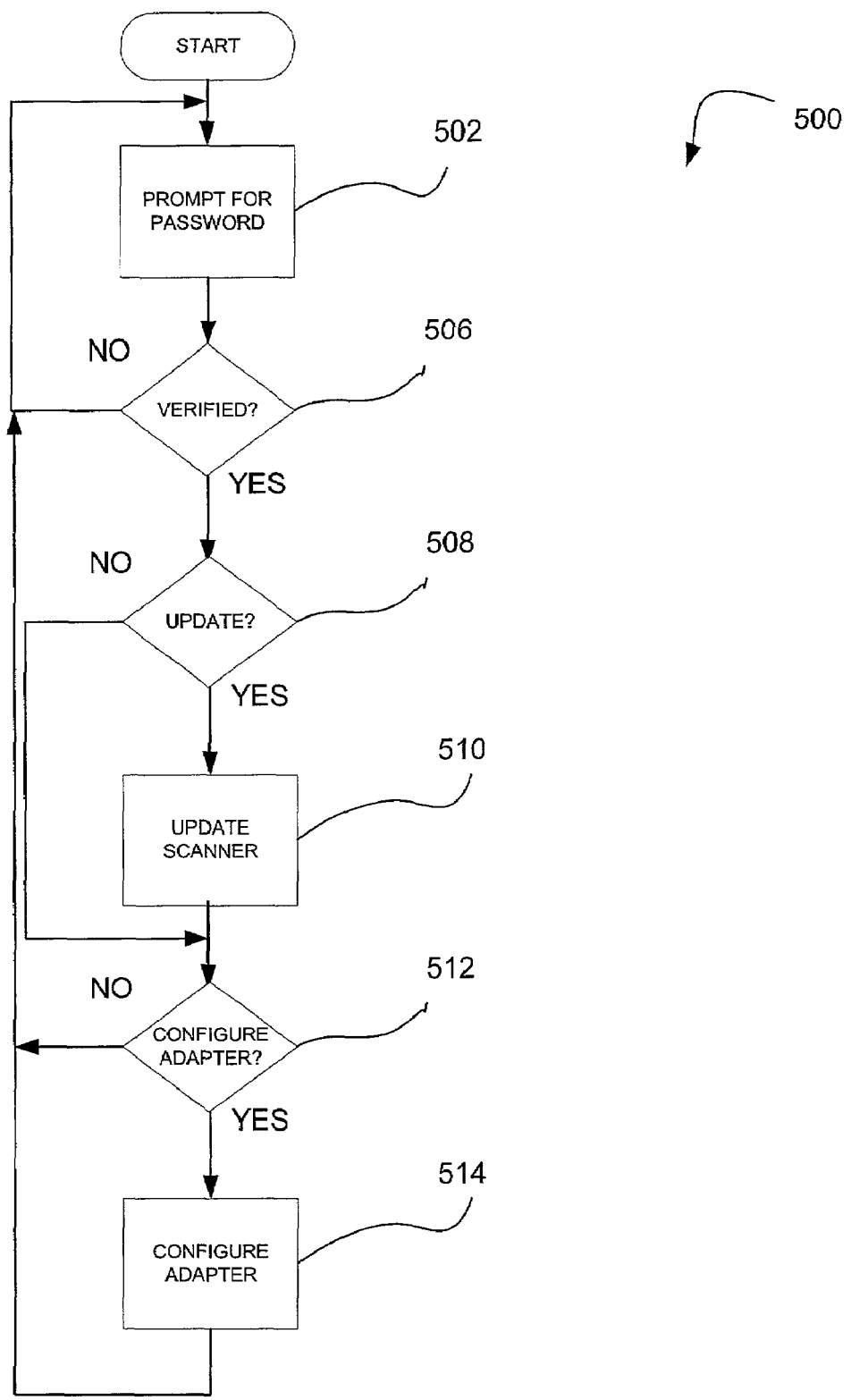
FIG. 5 illustrates a method for configuring a network adapter scanner, in accordance with one embodiment.

FIG. 5 illustrates a method 500 for configuring a network adapter scanner, in accordance with one embodiment. Again, the present method 500 may be used in the context of a network adapter and associated method like that mentioned hereinabove during reference to the previous figures. Of course, the present techniques may be utilized in any desired context.

Initially, a computer user or remote administrator may be prompted for a password in operation 502. In the case of the user of the computer being prompted, this may be accomplished utilizing the user interface driver 312 of FIG. 3. On the other hand, in the case of the remote administrator, the password request may be prompted using TCP/IP or any other desired network protocol. In the case of TCP/IP, the network adapter 300 may be assigned a dedicated IP address or MAC address for identification purposes.

If the password is received and verified, it is then determined whether the user or remote administrator wishes to update the virus signatures associated with the scanner 310 of the processor 302 (note decision 508) or configure the network adapter settings (note decision 512).

If an update is to be performed per decision 508, the virus signatures on the network adapter 300 may be updated in operation 510. It should be noted that the software administering the update may be positioned off the network adapter 300 on the computer or at a remote administrator site.

If the configuration settings are to be changed per decision 512, a user may alter various network adapter 300 settings in operation 514. These settings may range from conventional settings to determining which packets and files are of interest in the context of the method 400 of FIG. 4. Just by way of example, the user may configure the packet filtering to enable/disable packet assembling and scanning of HTTP file requests. Further, various other heuristics, well known virus scan settings, or the like may also be configured.

As an option, since the memory 308 may have a limited amount of capacity with which to store assembled files, the user may be able to set a threshold for the maximum size of file to be stored in memory, or possibly prioritize the scanning of files (i.e. executables-first, JPEG's-second, etc.) As a further option, direct memory access may be used to utilize desktop RAM.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A network adapter system, comprising:
 a processor positioned on a network adapter coupled between an end-point computer and a network, the network adapter capable of being installed on the end-point computer;
 wherein the processor is adapted for virus scanning and content scanning of network traffic transmitted between the end-point computer and the network, the content scanning including scanning for unwanted content other than viruses;
 wherein the system is operable such that the virus scanning utilizes virus signature files to scan for known types of malicious programs or data;

wherein the system is operable such that the virus signature files are stored on non-volatile solid state memory on the network adapter;

wherein the processor is user-configured;

wherein the processor determines whether received packets are of interest, passes the received packets that are not of interest to the end-point computer, and scans the received packets that are of interest;

wherein the system is operable such that a predetermined amount of the received packets are assembled for determining whether the received packets are of interest, the received packets including packets received at the network adapter;

wherein the system is operable such that if the received packets that are of interest fail the scanning, an alert is displayed which provides remedy options;

wherein the system is operable such that the received packets are of interest based on an associated protocol;

wherein the system is operable such that the received packets that are not of interest bypass the scanning;

wherein the system is operable such that scanning the received packets that are of interest is prioritized based on a file type associated with the received packets;

wherein the bypassing of the scanning includes bypassing a scanner and random access memory (RAM) of the processor, and communicating directly with a network driver of the end-point computer.

2. The network adapter system as recited in claim 1, wherein the processor is user-configured locally.

3. The network adapter system as recited in claim 1, wherein the processor is user-configured remotely via a network connection with the network adapter.

4. The network adapter system as recited in claim 1, wherein the processor is user-configured only after verification of a password.

5. The network adapter system as recited in claim 1, wherein a manner in which the scanning is performed is user-configured.

6. The network adapter system as recited in claim 1, wherein settings of the network adapter are user-configured.

7. The network adapter system as recited in claim 1, wherein the processor denies received packets that fail the scan.

8. The network adapter system as recited in claim 1, wherein the scan is performed based on user settings.

9. The network adapter system as recited in claim 1, wherein the content scanning enforces operational policies of an organization.

10. The network adapter system as recited in claim 9, wherein the operational policies include detecting entities including at least one of harassing content, pornographic content, junk e-mails, and misinformation.

11. The network adapter system as recited in claim 1, wherein the non-volatile solid state memory is user-protected by configuring a network adapter BIOS with a password that only a user can change.

12. The network adapter system as recited in claim 1, wherein the received packets that are of interest include executable files.

13. The network adapter system as recited in claim 1, wherein the network adapter includes a Peripheral Component Interconnect (PCI) card.

14. The network adapter system as recited in claim 1, wherein the network adapter includes an Industry Standard Architecture (ISA) card.

15. The network adapter system as recited in claim 1, wherein the network adapter includes an Integrated Services Digital Network (ISDN) adapter.

16. The network adapter system as recited in claim 1, wherein the network adapter includes a cable modem adapter.

17. The network adapter system as recited in claim 1, wherein the network adapter includes a broadband adapter.

18. The network adapter system as recited in claim 1, wherein the unwanted content includes at least one of harassing content, pornographic content, junk e-mails, and misinformation.

19. The network adapter system as recited in claim 1, wherein the unwanted content includes harassing content, pornographic content, junk e-mails, and misinformation.

20. The network adapter system as recited in claim 1, wherein the received packets are of interest based on the associated protocol, a source of the received packets, a timing of the received packets, and contents of the received packets.

21. The network adapter system as recited in claim 1, wherein the displaying of the alert includes sending the alert to a user interface driver or the end-point computer.

22. The network adapter system as recited in claim 1, wherein the prioritizing of the scanning of the received packets that are of interest based on the file type associated with the received packets includes prioritizing an executable file type before an image file type.

23. A method for scanning network traffic on a network adapter, comprising:

receiving packets at a network adapter including a processor positioned thereon, the network adapter installed on an end-point computer;

virus scanning and content scanning of the packets utilizing the processor, the content scanning including scanning for unwanted content other than viruses; and conditionally taking security measures if the packets fail the scan;

wherein the virus scanning utilizes virus signature files to scan for known types of malicious programs or data;

wherein the virus signature files are stored on non-volatile solid state memory on the network adapter;

wherein the processor is user-configured;

wherein the processor determines whether the received packets are of interest, passes the received packets that are not of interest to the end-point computer, and scans the received packets that are of interest;

wherein a predetermined amount of the received packets are assembled for determining whether the received packets are of interest, the received packets including packets received at the network adapter;

wherein if the received packets that are of interest fail the scanning, an alert is displayed which provides remedy options;

wherein the received packets are of interest based on an associated protocol;

wherein the received packets that are not of interest bypass the scanning;

wherein scanning the received packets that are of interest is prioritized based on a file type associated with the received packets wherein the bypassing of the scanning includes bypassing a scanner and random access memory (RAM) of the processor, and communicating directly with a network driver of the end-point computer.

24. The method as recited in claim 23, wherein the processor is user-configured locally.

25. The method as recited in claim 23, wherein the processor is user-configured remotely via a network connection with the network adapter.

26. The method as recited in claim 23, wherein the processor is user-configured only after verification of a password.

27. The method as recited in claim 23, wherein a manner in which the scanning is performed is user-configured.

28. The method as recited in claim 23, wherein the settings of the network adapter are user-configured.

29. The method as recited in claim 23, wherein the processor denies received packets that fail the scan.

30. The method as recited in claim 23, wherein the scan is performed based on user settings.

31. A system, comprising:
network adapter means for receiving packets, the network adapter means installed on an end-point computer;
processor means positioned on the network adapter means for virus scanning and content scanning of the packets, the content scanning including scanning for unwanted content other than viruses; and
means for conditionally taking security measures if the packets fail the scan;
wherein the system is operable such that the virus scanning utilizes virus signature files to scan for known types of malicious programs or data;
wherein the system is operable such that the virus signature files are stored on non-volatile solid state memory on the network adapter means;
wherein the processor means is user-configured;
wherein the processor means determines whether the received packets are of interest, passes the received packets that are not of interest to the end-point computer, and scans the received packets that are of interest;
wherein the system is operable such that a predetermined amount of the received packets are assembled for determining whether the received packets are of interest, the received packets including packets received at the network adapter means;
wherein the system is operable such that if the received packets that are of interest fail the scanning, an alert is displayed which provides remedy options;
wherein the system is operable such that the received packets are of interest based on an associated protocol;
wherein the system is operable such that the received packets that are not of interest bypass the scanning;
wherein the system is operable such that scanning the received packets that are of interest is prioritized based on a file type associated with the received packets
wherein the bypassing of the scanning includes bypassing a scanner and random access memory (RAM) of the processor means, and communicating directly with a network driver of the end-point computer.

32. A system, comprising:
network adapter means for receiving packets, the network adapter means being installed on an end-point computer;
logic positioned on the network adapter means for virus scanning and content scanning of the packets, the content scanning including scanning for unwanted content other than viruses; and
logic for conditionally taking security measures if the packets fail the scan;
wherein the system is operable such that the virus scanning utilizes virus signature files to scan for known types of malicious programs or data;
wherein the system is operable such that the virus signature files are stored on non-volatile solid state memory on the network adapter means;
wherein the logic is user-configured;
wherein the logic determines whether the received packets are of interest, passes the received packets that are not of interest to the end-point computer, and scans the received packets that are of interest;
wherein the system is operable such that a predetermined amount of the received packets are assembled for determining whether the received packets are of interest, the received packets including packets received at the network adapter means;
wherein the system is operable such that scanning the received packets that are of interest is prioritized based on a file type associated with the received packets;
wherein the system is operable such that the received packets are of interest based on an associated protocol;
wherein the system is operable such that the received packets that are not of interest bypass the scanning;
wherein the bypassing of the scanning includes bypassing a scanner and random access memory (RAM) of the processor including the logic positioned on the network adapter means, and communicating directly with a network driver of the end-point computer.

33. A network adapter system, comprising:
a processor positioned on a network adapter coupled between an end-point computer and a network, the processor including a packet assembly module, random access memory (RAM), and a scanner module, the network adapter being installed on the end-point computer; and
a user interface driver for identifying network traffic of interest transmitted between the end-point computer and the network;
wherein the processor is adapted for discerning and virus scanning and content scanning of network traffic of interest transmitted between the end-point computer and the network, the content scanning including scanning for unwanted content other than viruses;
wherein the system is operable such that the virus scanning utilizes virus signature files to scan for known types of malicious programs or data;
wherein the system is operable such that the virus signature files are stored on non-volatile solid state memory on the network adapter;
wherein the network adapter receives the network traffic;
wherein the processor is user-configured;
wherein the processor determines whether the received network traffic is of interest, passes the received network traffic that is not of interest to the end-point computer, and scans the received network traffic that is of interest;
wherein the system is operable such that a predetermined amount of the received network traffic is assembled for determining whether the received network traffic is of interest, the received network traffic including network traffic received at the network adapter;
wherein the system is operable such that scanning the received network traffic of interest is prioritized based on a file type associated with the received network traffic;
wherein the system is operable such that the received network traffic is of interest based on an associated protocol;
wherein the system is operable such that the received network traffic that is not of interest bypasses the scanning;
wherein the bypassing of the scanning includes bypassing a scanner and the RAM of the processor, and communicating directly with a network driver of the end-point computer.

34. The network adapter system as recited in claim 33, wherein the packet assembly module utilizes header information associated with received network traffic for assembling data fields of the received network traffic.

* * * * *